United States Patent
Kuchar

(10) Patent No.: US 10,912,256 B2
(45) Date of Patent: Feb. 9, 2021

(54) AIR ASSISTED SHAKER TABLE

(71) Applicant: George J. Kuchar, Mt. Olive, IL (US)

(72) Inventor: George J. Kuchar, Mt. Olive, IL (US)

(*) Notice: Subject to any disclaimer, the term of this patent is extended or adjusted under 35 U.S.C. 154(b) by 131 days.

(21) Appl. No.: 16/350,871

(22) Filed: Jan. 26, 2019

(65) Prior Publication Data
US 2020/0236859 A1  Jul. 30, 2020

(51) Int. Cl.
| | | |
|---|---|---|
| A01F 12/44 | (2006.01) | |
| B07B 4/08 | (2006.01) | |
| B07B 1/46 | (2006.01) | |
| B07B 1/36 | (2006.01) | |

(52) U.S. Cl.
CPC .......... *A01F 12/446* (2013.01); *A01F 12/444* (2013.01); *B07B 1/36* (2013.01); *B07B 1/4654* (2013.01); *B07B 4/08* (2013.01)

(58) Field of Classification Search
USPC .................................. 56/12.8; 460/101, 109
See application file for complete search history.

(56) References Cited

U.S. PATENT DOCUMENTS

| | | | | |
|---|---|---|---|---|
| 5,098,341 A | * | 3/1992 | Kuchar | A01F 12/444 460/99 |
| 5,487,703 A | * | 1/1996 | Kuchar | A01F 12/30 460/148 |
| 5,984,777 A | * | 11/1999 | Kuchar | A01F 12/448 460/101 |
| 6,458,031 B1 | * | 10/2002 | Matousek | A01F 12/44 460/100 |
| 10,321,634 B2 | * | 6/2019 | Bilde | A01F 12/44 |
| 2003/0183558 A1 | * | 10/2003 | Sandlin | B03B 4/02 209/31 |
| 2007/0256403 A1 | * | 11/2007 | Teroerde | A01D 41/1243 460/100 |
| 2014/0200057 A1 | * | 7/2014 | Farley | A01F 12/44 460/100 |
| 2017/0099777 A1 | * | 4/2017 | Weeks | A01F 12/446 |
| 2018/0027732 A1 | * | 2/2018 | Xu | A01D 41/1277 |

* cited by examiner

*Primary Examiner* — Nina Bhat
(74) *Attorney, Agent, or Firm* — Jim Helfrich

(57) ABSTRACT

A shaker table with air flow openings and airflow to pre-process the crop before it fully enters the separating and cleaning system of the harvester through a means of corrugation platforms with air flow directed from below to break up the material into a more easily cleaned condition.

8 Claims, 3 Drawing Sheets

AIR ASSISTED SHAKER TABLE

FIELD OF THE INVENTION

The present invention relates to cleaning grain such as corn as it passes through the thrashing system of a harvester and more particularly, to removing unwanted debris such as corn cobs, dirt and other unwanted vegetative mater from the desired grain.

BACKGROUND OF THE INVENTION

Harvesting of crops has always resulted in the accumulation of unwanted debris. Such debris consists of organic and inorganic matter. Such debris contaminates the wanted grains such as corn and lowers the quality of the sought-after grain. This debris contaminates the sought-after grain and can cause various bad results such as deterioration of quality, negatively affecting taste, lowering of nutritional content, and even poisoning of the grain itself. From the time of hand harvesting to present day mechanical harvesting it has always been a difficult process to remove all the unwanted debris contained in the harvested material.

Removing it creates additional problems connected with harvest speed. All crops have an ideal harvest period. Financial prudence dictates that a crop be harvested within that window at the lowest possible cost. This means limiting the number of mechanical harvesters used to bring in the crop. Modern harvesters cost many hundreds of thousands of dollars and of course requires a skilled operator to run them through the fields. Therefore, the faster a harvester can collect the crop from the field the lower the harvesting cost. Therein lies the second problem, the faster a crop is harvested the more difficult it becomes to "clean" that crop removing "most" of the debris before the crop is transported to storage. This presents a dilemma to the operator, does he or she harvest a lower quality crop faster or a higher quality crop slower? Harvested crops receive a reduced amount of money called dockage as their quality drops.

The third problem is that dirty grain is often carried out the rear of the harvester with other debris in its final cleaning. This can amount to multiple bushels of lost grain per acre. If the price of corn is multiplied times the number of bushels lost out the back of the harvester by the thousands of acres each machine may harvest in a year the amount of lost profit can be quite significant. So, the problem of cleaning grain affects several aspects of the operation as well as the quality and healthiness of the crop collected.

Solutions for cleaning harvested grain have always existed. In early times the harvested crop was tossed into the air to allow the wind to remove the lighter debris and then the larger debris were picked out of what remained. This same method has been used since but using mechanical methods to create the air and sift out the unwanted materials. A modern harvester uses mechanical air created by blowers or fans in conjunction with sieves or screens with various opening to selectively sort and remove debris.

The crop enters the harvester in a mixed condition consisting of particles ranging from smaller than the grain to larger than the grain. These particles also range in weight from lighter than the grain to heavier than the grain making it more complicated to sort and clean properly. Sieves which are louvers like window blinds laid on a horizontal plain can be adjusted to meet the needs of each crop. One may visualize corn kernels, for example, as all being the same size, but they are not. Various varieties of corn hybrids, and field conditions will dictate the size so as a harvester moves from field to field the machine may require adjustment for that crop.

As the crop moves through the harvester it goes through various cleaning processes. In a perfect scenario—the harvester (combine) has an attachment on the front, called a header, which is determined by the type of crop being harvested. The header is the portion of the combine that cuts the plant. This is the first "cleaning phase". In corn for example the full corn cob is removed from the stalk starting the cleaning process by leaving the stalk in the field. The header then moves the plant up the throat and into the combine itself.

Once the plant has been moved out of the header throat, it feeds it into the threshing cylinder. This consists of a series of horizontal rasp bars fixed across the path of the crop and in the shape of a quarter cylinder. Moving rasp bars or rub bars pull the crop through concaved grates that separate the grain and chaff from the straw. The grain heads fall through the fixed concaves. What happens next is dependent on the type of combine in question. Inmost modern combines, the grain is transported to the shoe by a set of 2, 3, or 4 (possibly more on the largest machines) augers, set parallel or semi-parallel to the rotor on axial mounted rotors and perpendicular on "Axial Flow" combines.

There are usually two sieves, one above the other. The sieves and a metal frame, which has many rows of "fingers" set reasonably close together. The angle of the fingers is adjustable as to change the clearance and control the size of material passing through. The top is set with more clearance than the bottom as to allow a gradual cleaning action. Setting the concave clearance, fan speed, and sieve size is critical (these are adjustable by the operator) to ensure that the crop is threshed properly, the grain is clean of debris, and that all the grain entering the machine reaches the grain tank or 'hopper'.

Heavy material, e.g., unthreshed cobs, fall off the front of the sieves and are returned to the concave for re-threshing.

The straw walkers are located above the sieves and have holes in them. Any grain remaining attached to the straw is shaken off and falls onto the top sieve. When the large debris reaches the end of the walkers it falls out the rear of the combine.

Harvest losses of 10 percent or more are not unusual, very careful management can place them in the 2 to 4 percent range. But 4% of a 220 bushel per acre crop can amount to well over thirty dollars per acre. On two thousand acres that amounts to over $64,000 which is all profit. There is no more cost for renting or owning the land or the machinery, no more cost for fertilizer or weed spray it is all profit.

Being skilled enough to make all the proper adjustments to air, sieves, walkers, and shaker pans is an issue. An even bigger issue is the variances through the field and the day caused by humidity that require those adjustments be modified to meet the new and changing conditions.

One of the largest problems encountered by other systems is what is called "bunching". The material being bunched together making it difficult for the cleaning dud separating processes to function properly. For example, kernels of grain wrapped up inside leaves or husks will not react to the cleaning and separating system as if they were released from their confinement. Many improvements have been made to help reduce this bunching problem, but it still occurs with way too much frequency. Large piles of material moving through the system cannot be properly separated and cleaned. This results in grain loss and contamination of the acquired crop.

It would be advantageous to provide a means to reduce grain loss. It would also be advantageous to provide a cleaner grain sample.

It would further be advantageous to provide a faster way to harvest a crop.

SUMMARY OF THE INVENTION

In accordance with the present invention, there is provided a shaker table with air flow openings and air flow to preprocess the crop before it fully enters the separating and cleaning system of the harvester through a means of corrugation platforms with air flow directed from below to break up the material into a more easily cleaned condition.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE INVENTION

Figure 1:
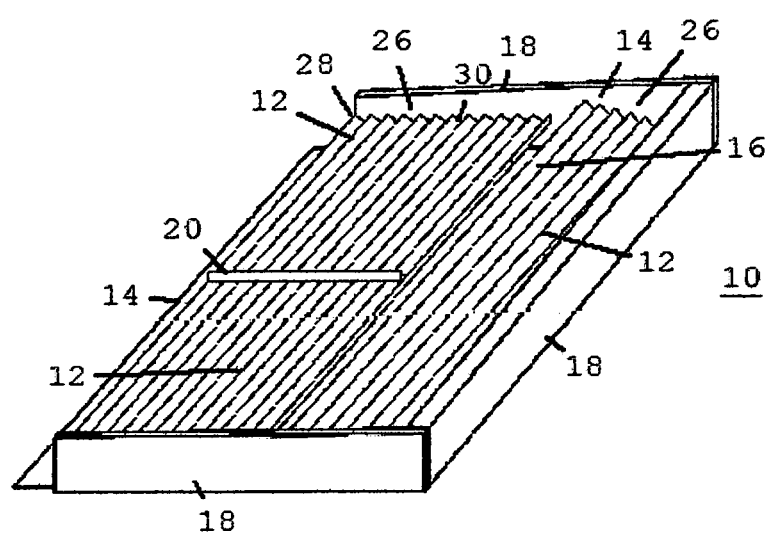
FIG. 1 is a perspective view of a shaker table with corrugation separators (2 sets) at least one hillside plate, frame, and air opening (s)

FIG. 1 is a perspective view of a shaker table 10 with corrugation 12 separators (2 sets) at least one hillside bar 20, frame 18 and air opening (s).

Figure 2:
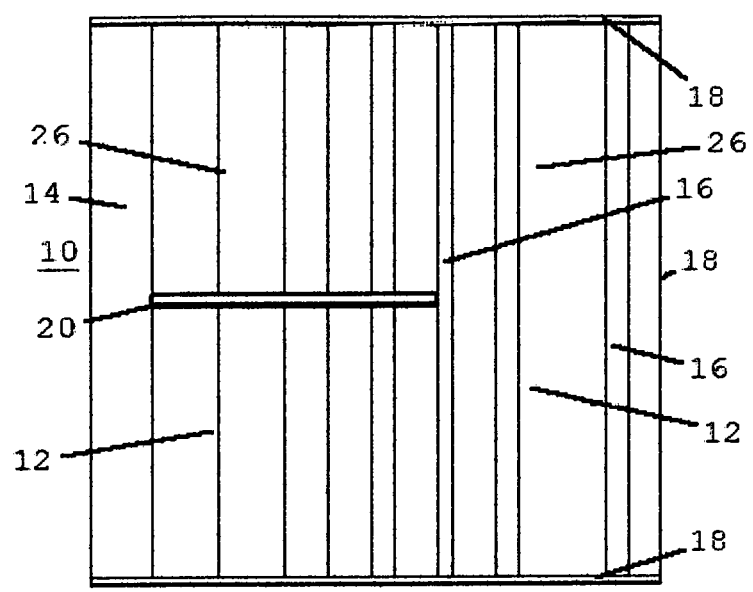
FIG. 2 is a top view of a shaker table showing at least one hill side plate, layout of corrugation separators and air flow opening (s)

FIG. 2 is a top view of a shaker table 10 showing at least one hill 28 side plate, layout of corrugation 12 separators and air flow opening 16 (s).

Figure 3:
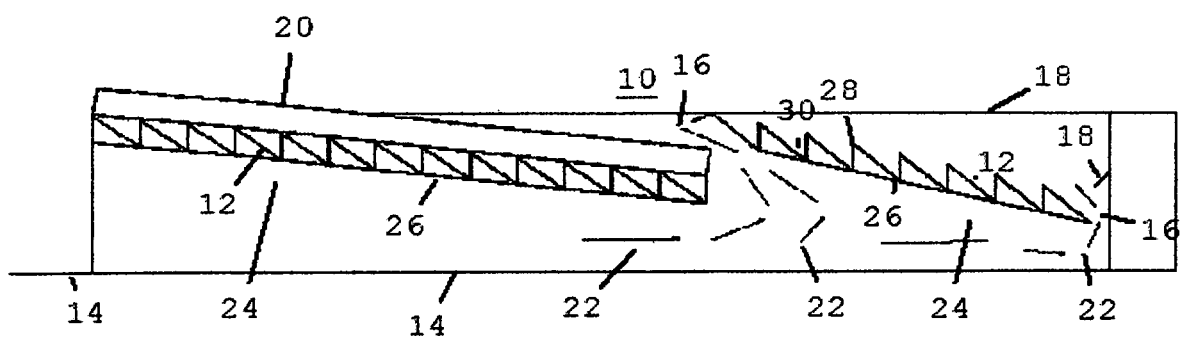
FIG. 3 is a side perspective view of a side perspective view of a shaker table showing the corrugation of the shaker table, bottom plate, air opening and air flow direction. also shown is the angle at which the corrugation sits so grain moves according to gravity to the lower portion of the shaker table, then drops through the air opening.

FIG. 3 is a side perspective view of a shaker table 10 showing the corrugation 12 of the shaker table 10, bottom plate 14, air opening and air flow 22 direction. Also shown is the angle at which the corrugation 12 sits so grain moves according to gravity to the lower portion of the shaker table 10, then drops through the air opening.

FIG. 1 shows a preferred embodiment of the present invention consisting of a shaker table 10 made up of at least one platform 26 arranged on a slope toward the rear of the harvester. The platform 26 consisting of a perpendicular section of corrugation 12 material with the up-right portion of the corrugation 12 generally vertical and the rearward portion of the corrugation 12 generally sloped to provide a hill 28 and valley 30 type configuration causing the grain to settle in the valley 30 portions and the unwanted debris to travel over the hill 28 portion toward the rear of the harvester.

The corrugation 12 being made of a stiff durable material such as sheet steel bent to a corrugated shape such as on a brake press and then weldably attached to a frame 18. The corrugation 12 could also be fastened through other means such as removable fasteners in a less desirable version of the present invention.

The corrugation 12 having a solid smooth air plate 24 attached to the lower portion to provide a smooth air flow 22 under the corrugation 12 of the platform 26.

In the preferred version of the present invention two platform 26 (s) are mounted to the frame 18 in succession with spaces in between known as air flow opening 16 (s) provided between each platform 26 and at the end of the last platform 26 so that air may travel under the platform 26 and above the bottom plate 14 and then upward through the air flow opening 16 provided. This air flow 22 creates a turbulence in the harvested material (mass) as the material flows over these air flow opening 16. As the air travels through the consolidated mass it breaks it up allowing the smaller or heavier material such as grain to fall through the air flow opening 16 to the bottom plate 14 and travel rearward towards further cleaning provided by the harvester while the lighter or larger pieces remain on top and continue towards the rear of the harvester where they are ejected back into the field.

At least one hillside bar 20 may be attached to the top of the corrugation 12 when the present invention is used to harvest crops that are located on hillsides. The purpose of the hillside bar 20 is to prevent all the harvested material from locating on one side of the platform 26 creating a large mass of material making it even more difficult to separate the wanted grains from the unwanted debris.

FIG. 2 shows a top view of the preferred version of the present invention, a shaker table 10, detailing the frame 18 with two platform 26 (s) weldably attached, air flow opening 16 (s) and hillside bar 20. The platform 26 (s) made up of a corrugation 12 top piece sloped downward to the rear with an air plate 24 (not shown) weldably attached to the bottom portion of the corrugation 12 to provide a smooth contained area beneath the corrugation 12 so that air flow 22 (not shown) may travel to the air flow opening 16 helping to separate the material for better cleaning.

A bottom plate 14 is weldably attached to the lower portion of the frame 18 and beneath the space below the air plate 24 (not shown) and air flow opening 16 to catch wanted materials that drop through the air flow opening 16.

FIG. 3 is a side perspective view of a shaker table 10 showing the corrugation 12 of the shaker table 10, bottom plate 14, air flow opening 16 and air flow 22 direction. Also shown is the angle at which the corrugation 12 sits so grain moves according to gravity to the lower portion of the shaker table 10 then drops through the air flow opening 16.

The corrugation 12 shape and relative measurements are shown as an example of a preferred embodiment of the present invention. This corrugation 12 may be formed by using several forming techniques including a brake, molding, and others. A consistent shape is important for predictability and adjustment of various other cleaning and separating parts in the harvester that are not part of the present invention.

A harvester is a complicated piece of equipment that has been refined over the many years since its invention but remains less than a perfect instrument for harvesting crops. The addition of a shaker table 10 with air flow 22 helps to improve its overall performance by causing the harvested material to pass over the shaker table 10 consisting of the corrugation 12 portions and air flow opening 16 portions. By increasing or decreasing both the air flow 22 openings and corrugation 12 platform 26 size, the harvester can be made more efficient in several capacities. These capacities include speed of harvest, cleaner grain sample for higher price at sale and less grain loss out the rear of the harvester caused by grain being mixed into the unwanted debris.

By providing a shaker table 10 equipped with a corrugated surface consisting of a hill 28 and valley 30 configuration with the slope from the top of the hill 28 toward the rear of the machine and causing a valley 30 to exist where the heavier and smaller portions of the mass taken in by the harvester begin to collect while the larger and lighter portions of that same mass remain on top of the hill 28 portion of the corrugation 12 as they travel toward the air flow opening 16 to be further broken apart by the air flow 22 so when traveling over the next platform 26 with its corrugation 12 they are further separated until again reaching the end of that platform 26 where the air flow opening 16 again provides air flow 22 for further breakup of the mass allowing for better separation and cleaning as the mass travels through the rest of the harvester.

The shaker table 10 being so situated that a constant shaking motion causing the shaker table to move back and forth with the harvester's chaffer frame occurs to assist it in the movement of the mass across the corrugation 12 and air flow opening 16 assisted by gravitational forces. The additional assist from the air flow 22 is critical to the breaking up of the consolidated mass. The mass becomes consolidated through the harvesting process and the moisture held within the mass at time of harvest. These conditions cause the mass to be consolidated and causes the mass to resist breaking apart. The mass being made up of all sorts of vegetative matter such as parts of stalks, leaves, weeds, and other vegetative matter that are taken in by the harvester along with the crop or grain. In order to end up with only the portion of the crop wanted these unwanted items must be separated so they can be removed, otherwise the wanted portion of the crop stays attached or contained within the mass and flows through and out the rear of the harvester back onto the field and is lost or wasted.

Properly directing the air flow 22 through the air flow opening 16 is critical to assisting the corrugation 12 portion of the shaker table 10 in breaking up that mass so the grain can be removed and kept and the waste material processed out the rear of the harvester back on to the field where it can be consumed by livestock or goes back into the field soil as a nutrient for the next crop.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. An air assisted shaker cleaner for cleaning grain earlier in the thrashing system of a harvester, comprising:

means for separating and cleaning grain as it travels through a harvester by running the grain across a shaker table with a corrugated surface including openings to allow air to flow through stirring the grain to remove unwanted particles;

means for causing the heavier grain to stay towards the bottom while allowing the larger and or lighter pieces to travel on top and toward the rear of the harvester by providing air flow to lift the liter material up while the heavier material, the grain, stays in the bottom;

air opening means for permitting air to travel through the debris on the shaker table as it passes rearward toward the rear of the harvester causing the grain and unwanted material to separate and break up allowing the grain to fall through the air opening while unwanted debris travels over the air flow opening and out the rear of the harvester;

means for disturbing the mixed grain and unwanted debris stirring it separating the heavier or smaller pieces from the larger or lighter pieces as it travels though the harvester;

means for causing the air flow at conditions below turbulent conditions thereby keeping the air from the bottom portion of the corrugation where turbulent conditions arise; and means for providing a corrugated sloping surface to separate grain from unwanted debris.

2. The air assisted shaker cleaner in accordance with claim 1, wherein said means for separating and cleaning grain in the harvester comprises a shaking, rigid, corrugated, sloping shaker table.

3. The air assisted shaker cleaner in accordance with claim 1, wherein said shaker table comprises a rigid, slopping, durable corrugation construction and arrangement permits the heavier grain to stay towards the bottom while allowing the larger and or lighter pieces to travel on top and toward the rear of the harvester.

4. The air assisted shaker cleaner in accordance with claim 1, wherein said air opening means for permitting air to travel through the debris on the shaker table is unobstructed permitting said air flow to pass rearward toward the rear of the harvester causes the grain and unwanted material to separate and break up while allowing the grain to fall through an air opening while unwanted debris travels over the air flow opening and out the rear of the harvester.

5. The air assisted shaker cleaner in accordance with claim 1, wherein said means for disturbing the mixed grain and unwanted debris comprises a moving, lifting, disturbing protrusions for stirring and separating the heavier or smaller grain pieces from the larger or lighter pieces as it travels though the harvester.

6. The air assisted shaker cleaner in accordance with claim 1, wherein said air flow means is a solid, rigid air place to prevent air from flowing towards the bottom portion of the harvester corrugation preventing turbulent conditions.

7. The air assisted shaker cleaner in accordance with claim 1, wherein said shaker table include grain separation means comprising a corrugated, rigid, durable, slopping platform.

8. An air assisted shaker cleaner for cleaning grain earlier in the thrashing system of a harvester, comprising:

A shaking, rigid, corrugated, sloping shaker table, for separating and cleaning grain as it travels through a harvester;

a rigid, slopping, durable corrugation, for causing the heavier grain to stay towards the bottom while allowing the larger and or lighter pieces to travel on top and toward the rear of the harvester;

a free of obstruction air flow opening, for permitting air to travel through the debris on the shaker table as it passes rearward toward the rear of the harvester causing the grain and unwanted material to separate and break up allowing the grain to fall through the air opening while unwanted debris travels over the air flow opening and out the rear of the harvester;

a moving, lifting, disturbing, stirring air flow, for disturbing the mixed grain and unwanted debris stirring it separating the heavier or smaller pieces from the larger or lighter pieces as it travels though the harvester;

a solid, rigid air plate, for causing the air flow to move with as little turbulence as possible; keeping the air from the bottom portion of the corrugation where turbulence would be created; and a corrugated, rigid, durable, slopping platform, for providing a corrugated sloping surface to separate grain from unwanted debris.

* * * * *